United States Patent
Kemmer et al.

(10) Patent No.: US 10,452,246 B2
(45) Date of Patent: Oct. 22, 2019

(54) CUSTOMIZABLE USER INTERFACES FOR SOFTWARE APPLICATIONS BASED ON USER- AND INDUSTRY-DEFINED CONSTRAINTS

(71) Applicant: SAP SE, Walldorf (DE)

(72) Inventors: Johann Kemmer, Muhlhausen (DE); Martina Rothley, Schwetzingen (DE)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 14/837,196

(22) Filed: Aug. 27, 2015

(65) Prior Publication Data
US 2017/0060395 A1 Mar. 2, 2017

(51) Int. Cl.
| | | |
|---|---|---|
| *G06F 8/41* | (2018.01) | |
| *G06F 3/0481* | (2013.01) | |
| *G06F 3/0488* | (2013.01) | |
| *G06F 3/0484* | (2013.01) | |
| *G06F 9/451* | (2018.01) | |
| *G06F 9/445* | (2018.01) | |
| *G06F 8/76* | (2018.01) | |
| *G06F 8/60* | (2018.01) | |
| *G06F 8/70* | (2018.01) | |

(52) U.S. Cl.
CPC .......... *G06F 3/04847* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 6,223,093 B1 * | 4/2001 | Kitamura | G05B 19/418 700/104 |
| 6,868,413 B1 * | 3/2005 | Grindrod | G06N 99/005 706/59 |
| 7,020,494 B2 | 3/2006 | Spriestersbach et al. | |
| 7,685,010 B2 | 3/2010 | Goldberg et al. | |
| 7,730,446 B2 * | 6/2010 | Anonsen | G06Q 10/06 717/104 |

(Continued)

OTHER PUBLICATIONS https://www.youtube.com/watch?v=LifCEgmf3D4 (Walker 2012). Screen image of relevant video portions is provided in the Office Action. (Year: 2012).*

(Continued)

*Primary Examiner* — Yongjia Pan
(74) *Attorney, Agent, or Firm* — Mintz Levin Cohn Ferris Glovsky and Popeo, P.C.

(57) ABSTRACT

A method, a system, and a computer program product for generating a customized user interface variant of a software application are disclosed. At least one configuration parameter in a plurality of configuration parameters is received. The configuration parameter is used for configuring a user interface of the software application. Based on the configuration parameter, the software application accesses at least one business process to generate the configured user interface. At least one requirement in a plurality of requirements of the business process is linked to the configuration parameter. The configured user interface can be generated based on the configuration parameter and the linking of the requirement of the business process and the configuration parameter.

12 Claims, 7 Drawing Sheets

400

| | 402 | 404 | 406 | 408 | 410 |
|---|---|---|---|---|---|
| | Business Scenario | Business Process Step | Application | Application User Interface Variant | Status |
| | Procure-to-Pay | Purchase Order | Maintain Purchase Order | Maintain Material Order | inactive |
| | Procure-to-Pay | Purchase Order | Maintain Purchase Order | Maintain Service Order | active |
| | Order-to-Cash | Customer Invoice | Display Customer Invoice | Display Maintenance Order | active |
| | ... | ... | ... | ... | ... |

(56) References Cited

U.S. PATENT DOCUMENTS

| | | | | |
|---|---|---|---|---|
| 8,490,082 B2* | 7/2013 | Moore | G06F 8/60 | 717/120 |
| 8,555,249 B2* | 10/2013 | Demant | G06F 8/38 | 717/104 |
| 8,677,310 B2* | 3/2014 | Weatherhead | G06F 8/70 | 700/131 |
| 8,751,938 B2* | 6/2014 | Conley | H04L 29/06 | 715/740 |
| 9,348,490 B2* | 5/2016 | Abrams | G06F 17/30905 | |
| 9,684,802 B2* | 6/2017 | Srinivasan | H04W 4/21 | |
| 9,753,716 B2* | 9/2017 | Gorti | G06F 8/61 | |
| 2004/0046787 A1* | 3/2004 | Henry | G06F 8/38 | 715/744 |
| 2005/0138558 A1* | 6/2005 | Duevel | G06F 9/44505 | 715/700 |
| 2005/0251755 A1* | 11/2005 | Mullins, II | G06F 3/0482 | 715/779 |
| 2006/0235882 A1* | 10/2006 | Mateescu | H04L 29/06027 | |
| 2007/0288837 A1* | 12/2007 | Eaves | G06F 17/243 | 715/234 |
| 2007/0294669 A1* | 12/2007 | Robalewski | G06F 9/44505 | 717/120 |
| 2008/0051076 A1 | 2/2008 | O'Shaughnessy et al. | | |
| 2009/0007056 A1* | 1/2009 | Prigge | G06Q 10/10 | 717/104 |
| 2011/0078606 A1* | 3/2011 | Hoff | G06Q 10/00 | 715/771 |
| 2011/0161942 A1 | 6/2011 | Brunswig et al. | | |
| 2013/0097583 A1* | 4/2013 | Kung | G06F 8/10 | 717/105 |
| 2013/0117719 A1* | 5/2013 | Bender | G06F 9/4443 | 715/866 |
| 2013/0132854 A1* | 5/2013 | Raleigh | G06F 3/0482 | 715/738 |
| 2013/0151996 A1 | 6/2013 | Nario et al. | | |
| 2013/0159906 A1* | 6/2013 | Knospe | G06F 3/0481 | 715/771 |
| 2013/0173507 A1 | 7/2013 | Chmiel et al. | | |
| 2013/0254262 A1 | 9/2013 | Udall | | |
| 2013/0298185 A1 | 11/2013 | Koneru et al. | | |
| 2013/0332178 A1* | 12/2013 | Zhong | G06Q 10/06 | 705/1.1 |
| 2014/0006368 A1 | 1/2014 | Moser et al. | | |
| 2014/0032759 A1 | 1/2014 | Barton et al. | | |
| 2014/0040177 A1 | 2/2014 | Sherman et al. | | |
| 2014/0164944 A1 | 6/2014 | Sivakumar et al. | | |
| 2015/0019498 A1* | 1/2015 | Rubinov | G06Q 40/00 | 707/687 |
| 2015/0067531 A1* | 3/2015 | Adimatyam | G06F 3/0481 | 715/745 |
| 2015/0244567 A1* | 8/2015 | Chen | H04L 41/22 | 715/733 |

OTHER PUBLICATIONS

Extended European Search Report for Application No. 16001760.4 dated Jan. 2, 2017.

\* cited by examiner

FIG. 4

| Business Scenario | Business Process Step | Application | Application User Interface Variant | Status |
|---|---|---|---|---|
| Procure-to-Pay | Purchase Order | Maintain Purchase Order | Maintain Material Order | inactive |
| Procure-to-Pay | Purchase Order | Maintain Purchase Order | Maintain Service Order | active |
| Order-to-Cash | Customer Invoice | Display Customer Invoice | Display Maintenance Order | active |
| ... | ... | ... | ... | ... |

| Industry | Business Process | Status |
|---|---|---|
| Professional Service Provider | Project-based Services | active |
| Professional Service Provider | Procure-to-Pay | active |
| Manufacturing | Configure-to-Production | inactive |
| ... | ... | ... |

FIG. 5

CUSTOMIZABLE USER INTERFACES FOR SOFTWARE APPLICATIONS BASED ON USER-AND INDUSTRY-DEFINED CONSTRAINTS

TECHNICAL FIELD

This disclosure relates generally to data processing and, in particular, to generating user interface variants of flexible mobile applications.

BACKGROUND

In today's world, many companies rely on software applications to conduct their business. Software applications deal with various aspects of companies' businesses, which can include service/product procurement, finances, product development, human resources, customer service, management, and many other aspects. Software applications typically generate user interfaces that help users of such applications perform various functions and/or tasks. The user interfaces can be pre-configured and activated at design time and adopted during runtime of a software application. The information displayed on a user interface can be dependent upon data that the software application accesses.

However, conventional systems do not allow for customization of user interfaces based on various industry-specific or other type of requirements as well as various user-specific requirements and/or content. Customization of user interfaces can allow for an improved user experience as well as standardize the way the information can be presented to a user when the user uses a software application at runtime.

SUMMARY

In some implementations, the current subject matter relates to a computer-implemented method for generating a customized user interface variant of a software application. The method can include receiving at least one configuration parameter in a plurality of configuration parameters for configuring a user interface of a software application, wherein, based on the at least one configuration parameter, the software application accesses at least one business process to generate the configured user interface at runtime; linking at least one requirement in a plurality of requirements of the at least one business process and the at least one configuration parameter; and generating the configured user interface based on the at least one configuration parameter and the linking of the at least one requirement of the at least one business process and the at least one configuration parameter. At least one of the receiving, the linking, and the generating, can be performed by at least one processor of at least one computing system.

In some implementations, the current subject matter can include one or more of the following optional features. The configuration parameter can include at least one of the following: a user-specific content and a pre-delivered content. The requirement can include at least one of the following: an industry specific requirement and a user-specific requirement.

In some implementations, the generating can include automatically configuring the user interface based on the linking of the requirement of the business process and the configuration parameter.

In some implementations, the linking can include activating the requirement in the plurality of requirements and activating the configuration parameter in the plurality of configuration parameters. The activation of the requirement and the configuration parameter can be performed using at least one of the following: automatic activation and manual activation. The generating can include configuring the user interface based on the linking of the activated requirement and the activated configuration parameter.

In some implementations, the generating can include generating a plurality of user interface variants based on the configuration parameter and the linking of the requirement of the business process and the configuration parameter.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an exemplary configured user interface, according to some implementations of the current subject matter;

FIG. 5 illustrates an exemplary table for providing linking between industry-specific packages and business processes, according to some implementations of the current subject matter;

DETAILED DESCRIPTION

Figure 1:
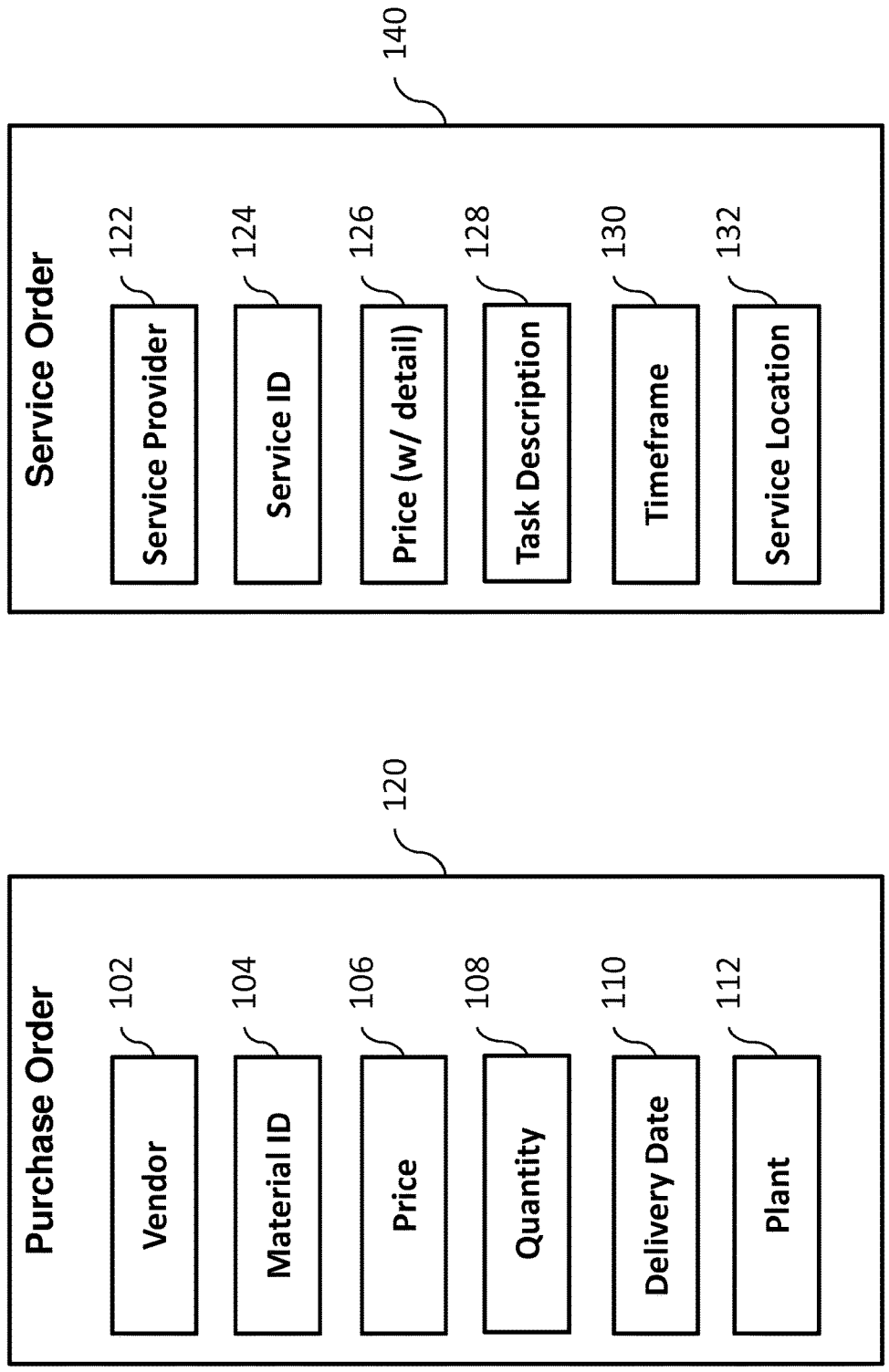
FIG. 1 illustrates exemplary user interfaces that can include a customized purchase order user interface and a customized service order user interface, according to some implementations of the current subject matter.

In some implementations, the current subject matter relates to mobile applications that can include a flexible adjustment capability enabling adaption of various software applications and/or components to a particular use and/or environment. In some implementations, the current subject matter can provide a native backend service containing one or more attributes and/or functionalities that can access internal business objects and that can be designed for a particular use (whether internal to a business entity and/or external). Further, the current subject matter can include a public solution model for exposing only a part of the backend service, which can be configured for release for an external use.

Additionally, the current subject matter can include an adaptation module of a mobile application or any other software application that can be used to adapt the application to various needs of a user (e.g., a business entity, a business application, a software application, a business process, a customer group, a customer, etc.). The adaptation module of the application can be used to consume a publicly exposed view of the backend service, which can be responsible for data processing and persistence. Further, the adaptation module of the application can include a set of attributes and/or functions that can be manipulated by an end user or a key user (e.g., a business entity, a business application, a software application, a business process, a customer group, a customer, etc.) to accommodate user's needs and/or desires. Based on the attributes and/or functions, variation of a user interface generated by the application can be derived and stored as well as be later available for use by other users, such as users belonging to a particular user group. The application can also be used to consume fields and/or functions of a public solution model, where scope of the application can be restricted by the adaptation module of the application. The application can be enterprise resource planning ("ERP") applications, customer service management ("CRM") applications, and/or any other business process applications, software application, etc.

Currently, when designing and developing applications, software vendors have to make critical compromises between ease of use of a software application and many different business use cases of the same software application. In most cases, this can lead to sub-optimal and sometimes unusable software applications, because either the software application is overloaded by (input) fields and/or functions (which are typically only partially used in a particular business scenario) or the required fields and/or functions are not available at all in the software application. This can further lead to poor reception of a mobile application amongst users. To overcome this problem, conventional software systems providers try to identify the most common use cases via costly customer evaluations and build multiple mobile applications customized to a specific use case, instead of attempting to cover multiple complete business scenarios by a single software application and to adopt it to the required usage. This can be an expensive approach in terms of development and/or maintenance and inherits a risk of missing various requirements of a customer base.

Further, it can be burdensome on the customer to switch between software applications covering different uses and depending on a specific scenario, even if they address the same business purpose. The current subject matter solves these problems by providing ability to flexible adapt a software application to industry specifics, certain business scenarios, customer requirements, options, as desired. The adaptions can be performed manually (e.g., by an end user or a key user that can be doing that for a group of end users), automatically (e.g., by another software application, business process, business application, pre-configuration, etc.), and/or both.

In some implementations, the software applications, including its various components (e.g., backend, frontend, user interfaces, functions, attributes, etc.), can be customized in accordance with industry standards, business standards and/or policies, user preferences, compatibility with other applications, etc. In some exemplary implementations, customization of applications can include customization of specific user interface fields.

FIG. 1 illustrates exemplary user interfaces that can include a customized purchase order user interface 120 and a customized service order user interface 140. The customized purchase order user interface 120 can include at least one of the following fields: a Vendor field 102, a Material ID field 104, a Price field 106, a Quantity field 108, a Delivery Date field 110, and a Plant field 112. There can be more fields than what is shown in the user interface 120. The fields 102-112 can be industry standard and/or specific to a particular industry and/or business entity. Similarly, the customized service order user interface 140 can include at least one of the following fields: a Service Provider field 122, a Service ID field 124, a Price field 126 (that can contain details as to various time periods (e.g., weekend, night shift, etc.)), a Task Description field 128, a Timeframe for Fulfillment field 130, and a Service Location field 132. Again, there can be more fields that can be included in the service order user interface 140, where the fields can be industry standard and/or specific to a particular industry and/or business entity. In some implementations, both user interfaces 120 and 140 can belong to the same business object in a backend system, while particular details of each user interface and/or its fields and/or functions, including any specifics and/or differences in the user interfaces, can be adapted as desired (as discussed herein). Thus, as shown in FIG. 1, the user interfaces 120 and 140 have a similar structure, i.e., each has six fields. The designations of each field in the user interfaces correspond to one another. As such, the Vendor field 102 in the purchase order can correspond to the Service Provider field 122 in the service order; the Material ID field 104 can correspond to the Service ID field 124; the Price field 106 can correspond to the Price field 126; the Quantity field 108 can correspond to the Task Description field 128; the Delivery Date field 110 can correspond to the Timeframe for Fulfillment field 130; and the Plant field 112 can correspond to the Service Location field 132. Because user interfaces 120 and 140 belong to the same object in the backend system, these user interfaces or variants can rely on similar information available from the backend. The information as well as the user interfaces themselves can be previously supplied and/or pre-configured (as discussed below with regard to FIG. 2). For example, information contained in the Delivery Date field 110 of the Purchase Order user interface variant 120 can include a date for delivery (e.g., Jan. 1, 2017) as requested by a purchase order, whereas the corresponding Service Order user interface variant 140 can include a Timeframe for Fulfillment field that can contain a range of dates when the purchase order can be fulfilled (e.g., Dec. 1, 2016-Feb. 1, 2017). Thus, both user interfaces can rely on the similar or same configuration and/or information to be placed in specific corresponding user interface fields, as shown in FIG. 1. The user interface variants can contain other corresponding fields (as indicated above) that can relate to one another in one or more ways and/or that can be generated based on the information and/or configuration contained in the backend system, where the information and/or configuration has been previously supplied (as discussed below).

In some implementations, the current subject matter can provide a flexible and multi-level adjustment layer of a software application, which can be used to customize at least one aspect of the software application (e.g., user interface, backend, frontend, etc.) based on industry-specific requirements (such as, those required during deployment), customer-specific requirements (e.g., by customizing selected business processes, business process operations, etc.), customer-specific content (e.g., by automatically customizing software application based on a specific business scenario), and/or a pre-delivered content for customizing application user interface(s) configuration based on dependencies of user interface variants, business process operations, etc.

Figure 2:
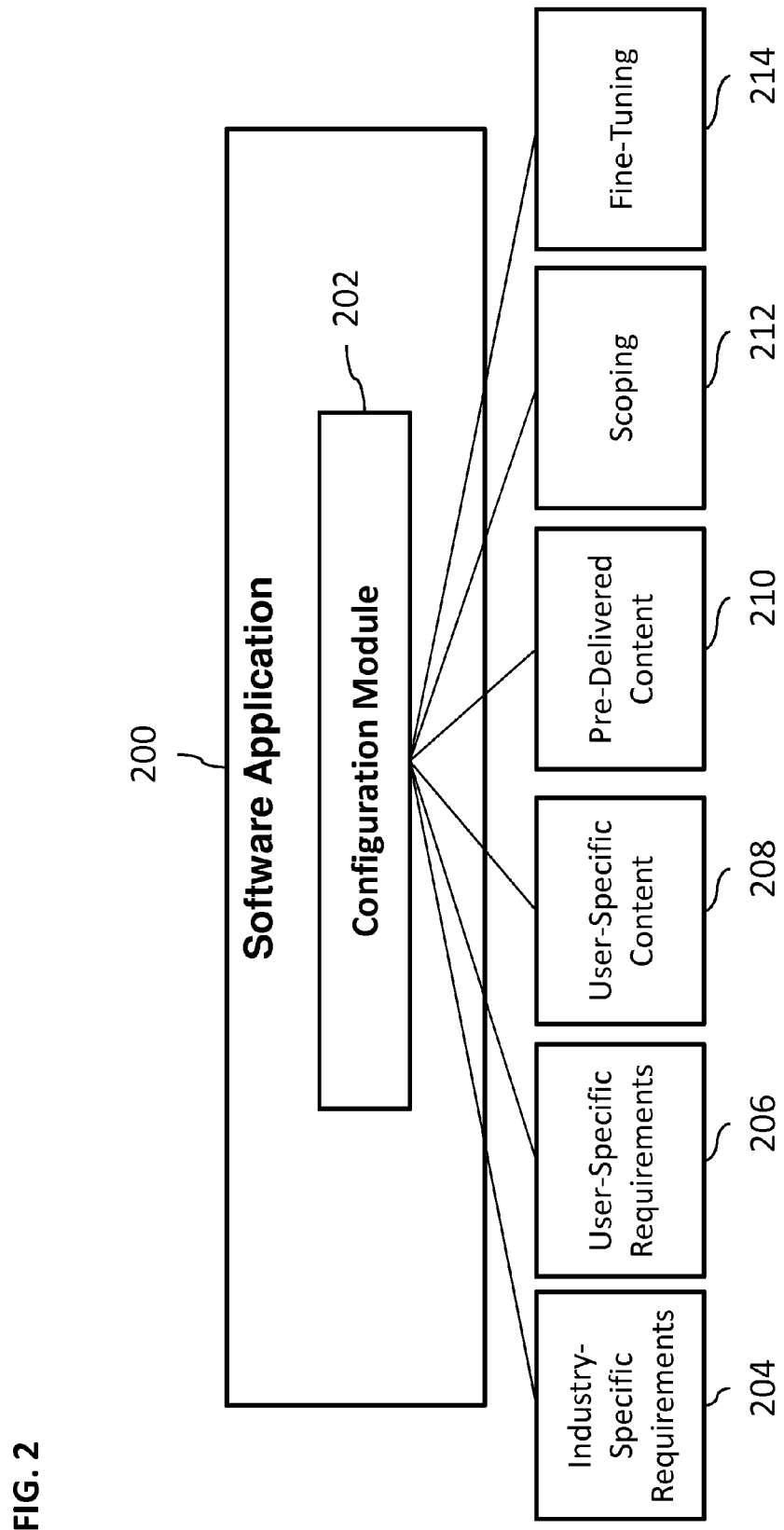
FIG. 2 illustrates an exemplary software application containing an exemplary configuration module, according to some implementations of the current subject matter.

FIG. 2 illustrates an exemplary software application 200 containing an exemplary configuration module 202, according to some implementations of the current subject matter. The configuration module 202 can be a software, a hardware, and/or any combination thereof. The configuration module 202 can be used to customize the software application 200, such as for generating a customized user interface (not shown in FIG. 2) for presentation to a user. The customized user interface can include arrangements, fields, functions, data, and/or any other components that may be standard to an industry in general and/or specific to a particular industry and/or specific to a particular user.

To customize and/or to adapt a software application (including, for example, a user interface that it generates), the configuration module 202 can rely on various data that can be stored in one or more memory locations (e.g., a database) that can be associated with and/or accessed by the software application 200, its backend and/or its frontend. The data can include at least one of the following: industry specific requirements data 204, user-specific requirements data 206, user-specific content data 208, pre-delivered content data 210, scoping content 212, and/or fine-tuning content 214. In some implementations, data 204-214 and/or any additional data can be used to pre-configure, scope, and/or fine-tune the information that can be presented on one or more user interfaces and/or its variants to a user. Such pre-configuration, scoping, and/or fine-tuning can be accomplished during design time and/or during runtime. One or more data 204-214 can be delivered together with the software application 200, requested by the application 200 and/or its user (e.g., a customer, a business process, another software application, a business application, etc.), inputted by the user (e.g., manually, automatically, and/or both), and/or supplied in any other fashion. Moreover, the data (and/or content, functions, etc.) 210-214 can be selected and/or de-selected as desired. Such selection/de-selection can be done automatically based on other data 210-214 (e.g., content contradicting industry requirements can be de-selected automatically, content that is not selected initially can be automatically included based on one or more user requirements, etc.), manually by the user and/or both. This can allow, the user interface variants to be fine-tuned to industry, entity, and/or user specifics. For the purposes of illustration, the following discussion will be presented in terms of customization of a user interface that can be generated by the software application 200 for use by a particular user. The configuration module 202 can be used to configure user interfaces during deployment, customization, and/or runtime of the software application 200.

In some implementations, the data 204-214 can be stored in tables, which the configuration module 202 can access to configure and/or customize a user interface that can be generated by the application 200. Based on the table data 204-214, one or more application user interface variants (e.g., different type of user interfaces) can be generated. The user interface variants can be assigned to business processes based on, for example, pre-delivered content data 210, which can be extensible by the user, and/or other data 204-208. Additionally, user's business processes can be linked to requirements of various industries based on the pre-delivered content data 210 and/or any other data 204-208. Further, user's business processes can be customized based on user-specific requirements data 206 and/or user-specific content data 208. Also, elements of the user interface variants can be customized, e.g., hidden, renamed, defaulted, etc., based on user-specific requirements data 206 and/or user-specific content data 208. The above configurations can occur during design time of the software application. Additionally, various scoping content 212 and/or fine-tuning content 214 can be selected/de-selected by the user to make the application user-interface variants generated in accordance with industry standards and/or requirements, business standards and/or requirements, user-specific standards and/or requirements, and/or any other options. Using the data 204-214 (dependent on whether or not it is selected), the configuration module can perform such configuration of user interface variants. At runtime, the application user interface configurations can be analyzed and an appropriate user interface can be delivered to the user. The delivery of the user interface can be based on specific business environment in which the application is running.

Figure 3:
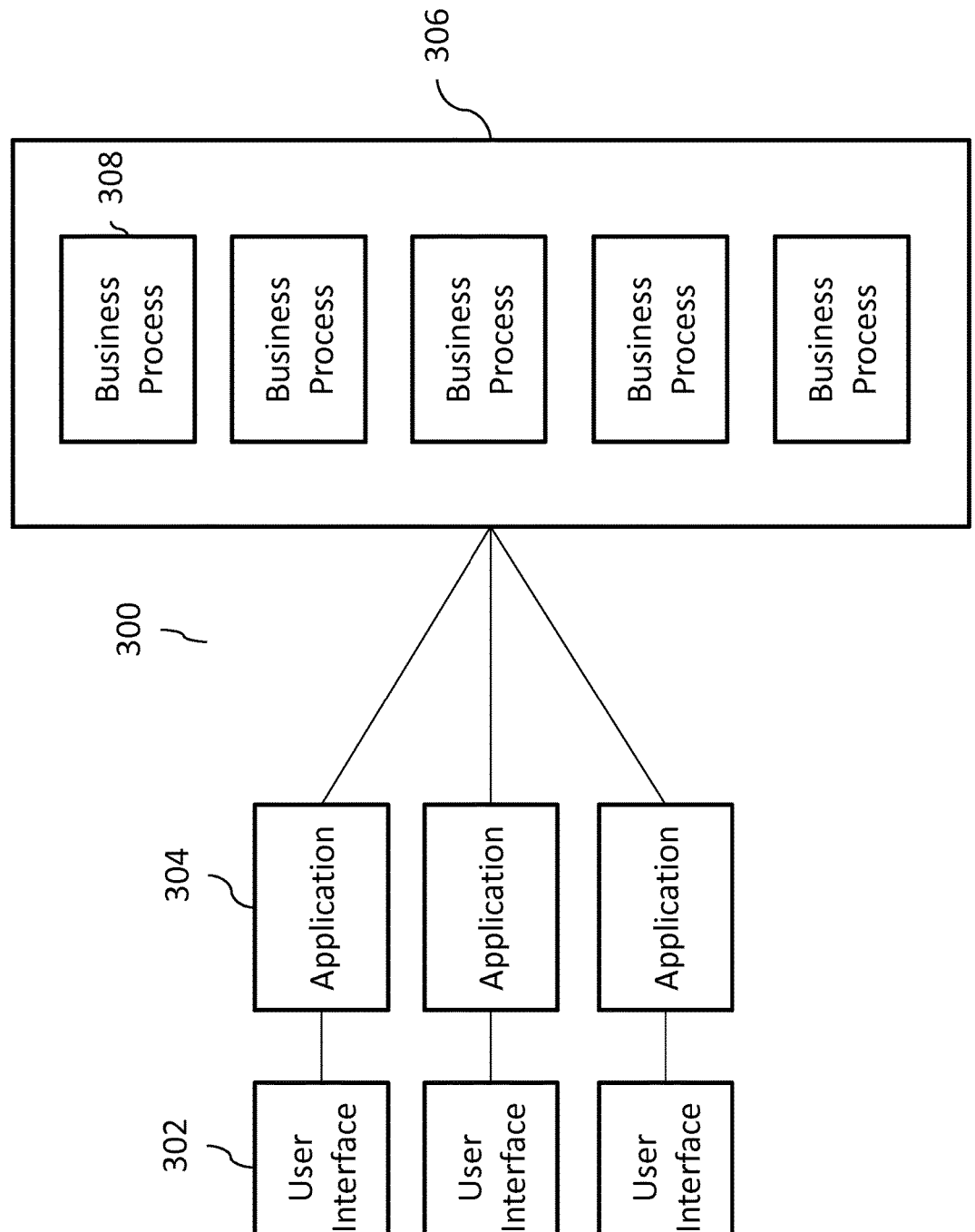
FIG. 3 illustrates an exemplary system for linking applications and/or their corresponding user interfaces with one or more business processes, according to some implementations of the current subject matter.

FIG. 3 illustrates an exemplary system 300 for linking applications and/or their corresponding user interfaces with one or more business processes, according to some implementations of the current subject matter. The system 300 can include one or more applications (e.g., software applications, business process applications, etc.) 304 being communicatively connected to a system 306, where the system 306 can be a user system that can be running one or more business processes 308. The business processes 308 can be related to purchasing, customer service, sales, production, financial management, accounting, human resources, administration, and/or any other process.

One or more applications 304 can generate one or more user interfaces 302 for presentation to the user (not shown in FIG. 3). Some application can share a user interface. User interfaces 302 can be generated by the application 304 based on an access of one or more business processes 308 by the application 304. The business processes 308 can also access various storage locations (e.g., databases) for retrieval of data that may have been requested by the application 304 for presentation to the user.

The user interfaces 302 can be configured in accordance with various industry-specific requirements, user-specific requirements, user specific content, and/or pre-delivered content, and/or any other parameters, functionalities, and/or artifacts. These parameters, functionalities, and/or artifacts can be stored by the system 300 and/or can be pre-delivered with the application 304 and/or can be accessed from any storage location by the application 304. The parameters, functionalities, and/or artifacts can be accessed at runtime, at design time, and/or both, so that user interface(s) 302 can be presented to the user in accordance with a user-desired configuration.

FIG. 4 illustrates an exemplary configured user interface 400, according to some implementations of the current subject matter. The user interface 400 illustrates an exemplary scenario related to processes involving purchasing and/or sales. The user interface 400 can include a table containing a business scenario column 402, a business process step column 404, an application column 406, an application user interface variant column 408, and a status column 410. The column 402 can be indicative of various business scenarios (e.g., procure-to-pay, order-to-cash, etc.) that may be of interest to the user. The column 404 can be indicative of various business process steps that may be taken in accordance with the business scenario indicated in column 402 (e.g., purchase order, customer invoice, etc.). The column 406 can indicate a particular application that may be executed in accordance with a specific business scenario shown in column 402 and the business process step shown in column 404 (e.g., maintain purchase order, display customer invoice, etc.). Based on the column 404, an appropriate application user interface variant can be shown in column 408 (e.g., maintain material order, maintain service order, display maintenance order, etc.). The status column 410 can be indicative of an activation status of the application user interface variant (e.g., active, inactive, etc.).

In some implementations, the table in the user interface 400 cannot be changed (other than the activation status shown in column 410). In that case, the table can be extended by the user (such as in case of user specific mobile applications). The activation status of the application user interface variant, as shown in column 410, can be populated either by industry-specific deployment (as shown in FIG. 5) and/or by customizing the table shown in FIG. 4 in accordance with user requirements. In some implementations, the columns of the table shown in FIG. 4 can be configured based on various parameters, functionalities, and/or artifacts, as discussed above, where some columns can be predetermined and cannot be altered while others can be configured, deleted, added, changed, etc. Such configuration can be applicable not only to the way the data is displayed by the current subject matter system, but also by the way the data is accessed, stored and/or assembled for presentation to the user via a configured user interface.

In some implementations, the current subject matter system can also provide a linking between various industry-specific packages and business processes, which can allow further customization of data gathering as well as user interfaces delivered to the user. In particular, this linking can allow industry-specific pre-customization during deployment and/or activation of a subset of application user interface variants used by the system for a particular purpose. In some implementations, the linking can be in a form a table that can include such industry-specific customization parameters, where the table can be included and/or delivered by a software vendor with the software application. The end user of the application may be prohibited from modifications of the entire table and/or some of its parts. Alternatively, the end user may be given administrative rights to modify the table as desired.

FIG. 5 illustrates an exemplary table 500 for providing linking between industry-specific packages and business processes, according to some implementations of the current subject matter. The table 500 is provided for exemplary, non-limiting and ease of illustration purposes and is not intended to limit the scope of the current subject matter. The table 500 can include an industry column 502, a business process column 504, and a status column 506. The industry column 502 can indicate specific industries (e.g., professional service provider, manufacturing, etc.), which may have specific requirements for the way data is obtained and displayed on a user interface. The column 504 can include information about specific business processes (e.g., project-based services, procure-to-pay, configure-to-production, etc.) that may be associated with a particular industry shown in column 502. The business processes may be generic to all industries and/or specific to a particular industry. The status column 506 can be indicative of a status of whether or not configuration for a particular industry and/or business process has been activated (e.g., active, inactive, etc.). The table 500 can be prepared based on parameters, functionalities, and/or artifacts, discussed above.

In some implementations, in addition to pre-configuration during deployment, the user can choose to activate and/or deactivate one or more application user interface variants. The user can be provided with a warning based on a determination of whether a particular activation and/or deactivation of an application user interface variant may or may not contradict with other user interfaces, license agreements, and/or parameters, functionalities, and/or artifacts. Activation/deactivation of application user interface variants can be performed manually and/or automatically by changing the status in the status column of one or both tables shown in FIGS. 4-5. This change can affect whether or not a particular information related either to the industry, business scenario, business process step, and/or application will be obtained and/or presented in a user interface (and hence, a particular user interface variant may or may not displayed). Further, in some implementations, fields, actions, etc. of user interface variants can be renamed and/or actions to be taken can be changed (e.g., fields actions can be hidden and/or defaulted to certain fields and/or functions) either manually (e.g., by a user) and/or automatically.

In some implementations, generation and/or selection of a user interface variant can be done automatically and based on a particular business process that may be embedded in an application, where the user interface adoption can be based on a specific business scenario and/or evaluation of precursor parameters, functionalities, and/or artifacts.

In some implementations, the current subject matter can allow flexible customization of applications (e.g., ERP, CRM application) and/or associated user interfaces to accommodate various business needs in different business contexts. The applications and/or interfaces can be built by software developers and can allow pre-configuration and/or customization to suit user needs, which can allow software developers to cover many business cases by a single application. As stated above, this can be accomplished using an application user interface configuration layer, which can serve different purposes (e.g., industry-specific, customer-specific, context-sensitive configurations, etc.) to ensure a better user experience while reducing development and maintenance efforts with the software developer.

Figure 6:
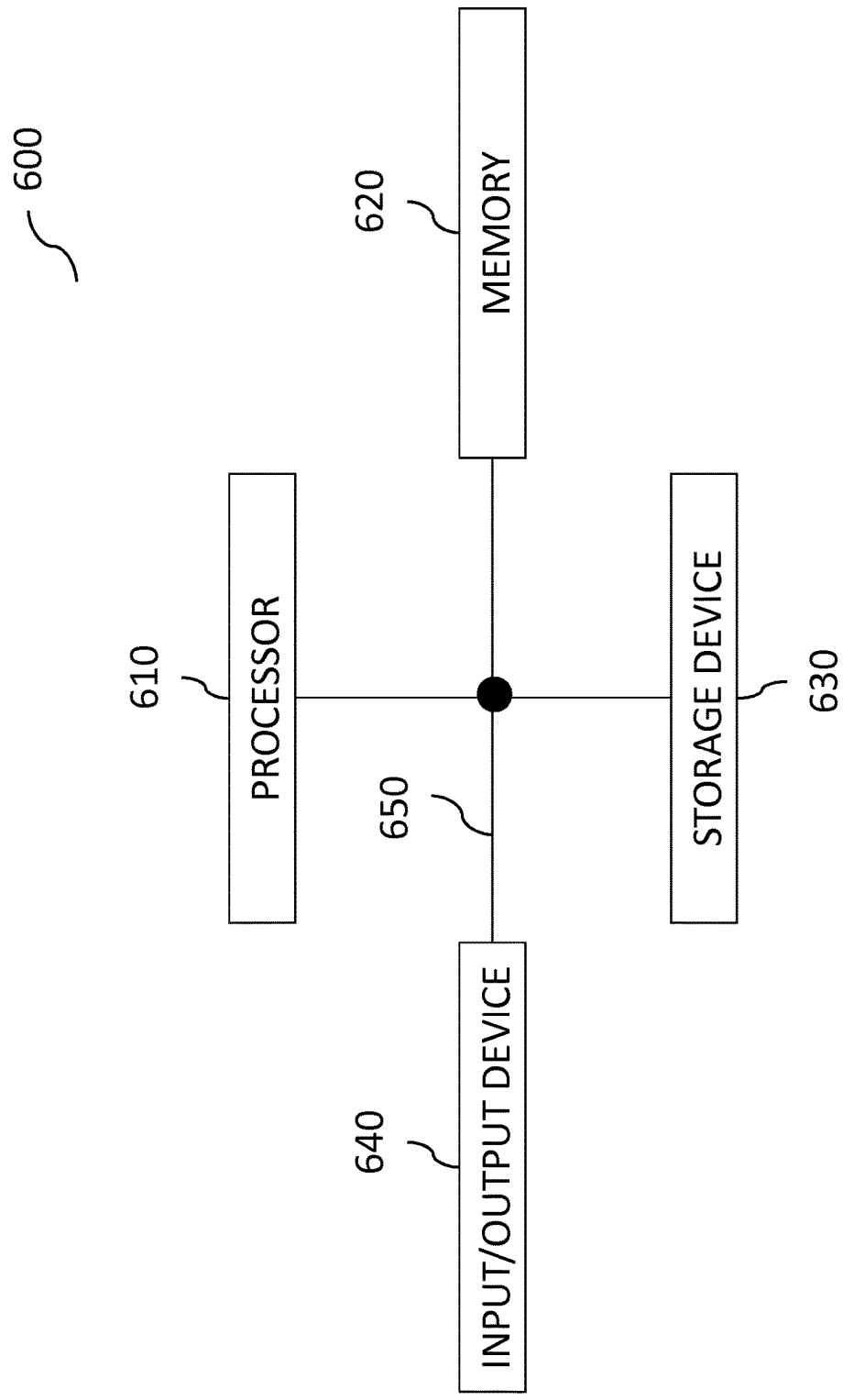
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
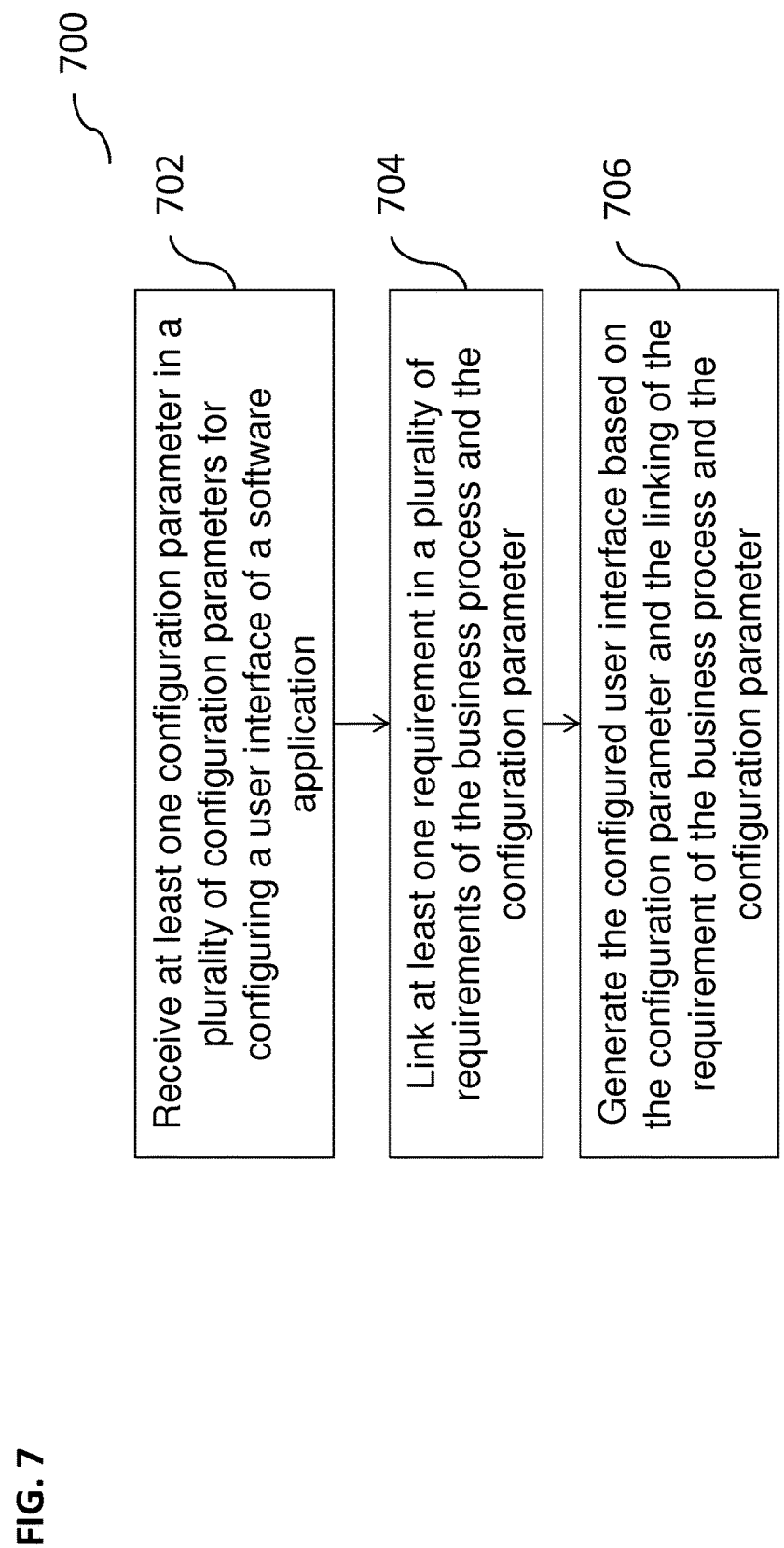
FIG. 7 illustrates an exemplary method, according to some implementations of the current subject matter.

FIG. 7 illustrates an exemplary method 700 for generating a customized user interface variant of a software application, according to some implementations of the current subject matter. At 702, at least one configuration parameter in a plurality of configuration parameters can be received. The configuration parameters can be received at design time of a software application. The parameter can be used for configuring a user interface of the software application. Based on the configuration parameter, the software application can access at least one business process to generate the configured user interface. At 704, at least one requirement in a plurality of requirements of the business process can be linked to the configuration parameter. The linking can be performed at design time. At 706, the configured user interface can be generated based on the configuration parameter and the linking of the requirement of the business process and the configuration parameter. The user interface can be generated at runtime. In some implementations, user interfaces can be generated during design-time and/or delivered statically by the software developer and/or vendor, and can be activated and/or deactivated during configuration and/or can be dynamically chosen during runtime based on a particular business process.

In some implementations, the current subject matter can include one or more of the following optional features. The configuration parameter can include at least one of the following: a user-specific content and a pre-delivered content. The requirement can include at least one of the following: an industry specific requirement and a user-specific requirement.

In some implementations, the generating can include automatically configuring the user interface based on the linking of the requirement of the business process and the configuration parameter.

In some implementations, the linking can include activating the requirement in the plurality of requirements and activating the configuration parameter in the plurality of configuration parameters. The activation of the requirement and the configuration parameter can be performed using at least one of the following: automatic activation and manual activation. The generating can include configuring the user interface based on the linking of the activated requirement and the activated configuration parameter.

In some implementations, the generating can include generating a plurality of user interface variants based on the configuration parameter and the linking of the requirement of the business process and the configuration parameter.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving, at a software application and prior to runtime of the software application, at least one configuration parameter in a plurality of configuration parameters for configuring a first user interface of the software application, wherein the at least one configuration parameter comprises a user-selected content and/or a pre-delivered content;
   accessing, by the software application and in response to receiving the at least one configuration parameter, at least one process for generating a configured user interface at runtime, the at least one process comprising a plurality of requirements;
   linking at least one requirement of the plurality of requirements to the at least one configuration parameter, the at least one requirement comprising an industry specific requirement specifying, based on an industry associated with the industry specific requirement, a way in which data associated with the at least one process is obtained from a data source and/or is displayed on the configured user interface, wherein the linking includes accessing a table, the table including an industry column indicating the industry, a process column indicating a process associated with the industry, and a status column indicating whether the industry specific requirement for the industry has been activated;
   generating a user interface variant, the generating based on the at least one configuration parameter, the linking of the at least one requirement of the at least one process, and the at least one configuration parameter, wherein the user interface variant comprises a type of user interface that belongs to a same object in a backend system as the configured user interface; and
   generating the configured user interface based on the at least one configuration parameter, the at least one requirement, and the linking of the at least one requirement to the at least one configuration parameter, wherein the configured user interface comprises:
      the user interface variant; and
      an indication of an activation status of the user interface variant, the activation status based on the at least one requirement, wherein the generated configured user interface is indicative of the activation status;
   wherein at least one of the receiving, the linking, and the generating, is performed by at least one processor of at least one computing system.

2. The method according to claim 1, wherein the at least one requirement includes a user-specific requirement.

3. The method according to claim 1, wherein the generating further comprises automatically configuring the configured user interface based on the linking of the at least one requirement of the at least one process and the at least one configuration parameter.

4. The method according to claim 1, wherein the industry specific requirement indicates a business process associated with the industry.

5. The method according to claim 1, wherein the configured user interface further comprises a table including:
   a scenario column indicating a scenario associated with a user;
   a process column indicating a process associated with the scenario of the scenario column;
   an application column indicating an application executed in accordance with the scenario and the process; and a user interface variant column indicating the user interface variant, the user interface variant based on the process column.

6. The method according to claim 5, wherein the table further comprises a status column indicating the activation status of the user interface variant.

7. A system comprising:
at least one programmable processor; and
a non-transitory machine-readable medium storing instructions that, when executed by the at least one programmable processor, cause the at least one programmable processor to perform operations comprising:
receiving, at a software application and prior to runtime of the software application, at least one configuration parameter in a plurality of configuration parameters for configuring a user interface of the software application, wherein the at least one configuration parameter comprises a user-selected content and/or a pre-delivered content;
accessing, by the software application and in response to receiving the at least one configuration parameter, at least one process for generating a configured user interface at runtime, the at least one process comprising a plurality of requirements;
linking at least one requirement of the plurality of requirements to the at least one configuration parameter, the at least one requirement comprising an industry specific requirement specifying, based on an industry associated with the industry specific requirement, a way in which data associated with the at least one process is obtained from a data source and/or is displayed on the configured user interface, wherein the linking includes accessing a table, the table including an industry column indicating the industry, a process column indicating a process associated with the industry, and a status column indicating whether the industry specific requirement for the industry has been activated;
generating a user interface variant, the generating based on the at least one configuration parameter, the linking of the at least one requirement of the at least one process, and the at least one configuration parameter, wherein the user interface variant comprises a type of user interface that belongs to a same object in a backend system as the configured user interface; and
generating the configured user interface based on the at least one configuration parameter, the at least one requirement, and the linking of the at least one requirement to the at least one configuration parameter, wherein the configured user interface comprises:
the user interface variant; and
an indication of an activation status of the user interface variant, the activation status based on the at least one requirement, wherein the generated configured user interface is indicative of the activation status.

8. The system according to claim 7, wherein the at least one requirement includes a user-specific requirement.

9. The system according to claim 7, wherein the generating further comprises automatically configuring the configured user interface based on the linking of the at least one requirement of the at least one process and the at least one configuration parameter.

10. A computer program product comprising a non-transitory machine-readable medium storing instructions that, when executed by at least one programmable processor, cause the at least one programmable processor to perform operations comprising:
receiving, at a software application and prior to runtime of the software application, at least one configuration parameter in a plurality of configuration parameters for configuring a user interface of the software application, wherein the at least one configuration parameter comprises a user-selected content and/or a pre-delivered content;
accessing, by the software application and in response to receiving the at least one configuration parameter, at least one process for generating a configured user interface at runtime, the at least one process comprising a plurality of requirements;
linking at least one requirement of the plurality of requirements to the at least one configuration parameter, the at least one requirement comprising an industry specific requirement specifying, based on an industry associated with the industry specific requirement, a way in which data associated with the at least one process is obtained from a data source and/or is displayed on the configured user interface, wherein the linking includes accessing a table, the table including an industry column indicating the industry, a process column indicating a process associated with the industry, and a status column indicating whether the industry specific requirement for the industry has been activated;
generating a user interface variant, the generating based on the at least one configuration parameter, the linking of the at least one requirement of the at least one process, and the at least one configuration parameter, wherein the user interface variant comprises a type of user interface that belongs to a same object in a backend system as the configured user interface; and
generating the configured user interface based on the at least one configuration parameter, the at least one requirement, and the linking of the at least one requirement to the at least one configuration parameter, wherein the configured user interface comprises:
the user interface variant; and
an indication of an activation status of the user interface variant, the activation status based on the at least one requirement, wherein the generated configured user interface is indicative of the activation status.

11. The computer program product according to claim 10, wherein the at least one requirement includes a user-specific requirement.

12. The computer program product according to claim 10, wherein the generating further comprises automatically configuring the configured user interface based on the linking of the at least one requirement of the at least one process and the at least one configuration parameter.

* * * * *